(12) United States Patent
Ke

(10) Patent No.: US 12,160,327 B2
(45) Date of Patent: Dec. 3, 2024

(54) METHOD FOR SUPPORTING PORT ASSOCIATION, GATEWAY SELECTION METHOD, AND COMMUNICATIONS DEVICE

(71) Applicant: VIVO MOBILE COMMUNICATION CO., LTD., Guangdong (CN)

(72) Inventor: Xiaowan Ke, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 314 days.

(21) Appl. No.: 17/571,482

(22) Filed: Jan. 8, 2022

(65) Prior Publication Data

US 2022/0131720 A1 Apr. 28, 2022

Related U.S. Application Data

(63) Continuation of application No. PCT/CN2020/100417, filed on Jul. 6, 2020.

(30) Foreign Application Priority Data

Jul. 12, 2019 (CN) .......................... 201910631594.9

(51) Int. Cl.
*H04L 12/46* (2006.01)
*H04L 47/28* (2022.01)
*H04W 76/12* (2018.01)

(52) U.S. Cl.
CPC ........ *H04L 12/462* (2013.01); *H04L 12/4633* (2013.01); *H04L 47/286* (2013.01); *H04W 76/12* (2018.02)

(58) Field of Classification Search
None
See application file for complete search history.

(56) References Cited

U.S. PATENT DOCUMENTS

2007/0083470 A1  4/2007  Bonner et al.
2015/0103828 A1  4/2015  Chandhoke et al.
(Continued)

FOREIGN PATENT DOCUMENTS

CN  101385277 A  3/2009
CN  108809852 A  11/2018
(Continued)

OTHER PUBLICATIONS

European Search Report in Application No. 20840767.6 Dated Jul. 13, 2022.
"Addressing open issues for TSN" SA WG2 Meeting #132, Qualcomm Incorporated, S2-1903273, Apr. 8, 2019.
(Continued)

*Primary Examiner* — Hong Shao
(74) *Attorney, Agent, or Firm* — Price Heneveld LLP

(57) ABSTRACT

Embodiments of this disclosure provide a method for supporting port association, a gateway selection method, and a communications device. The method for supporting port association, applied to a first communications device, includes: performing a first operation, where the first operation includes at least one of the following: determining a port corresponding to a port related information container; determining a port corresponding to a port related information container; and transmitting signaling related to the tunnel, where the signaling related to the tunnel includes a port related information container; or transmitting a port related information container to the tunnel.

9 Claims, 8 Drawing Sheets

(56) References Cited

U.S. PATENT DOCUMENTS

| | | | |
|---|---|---|---|
| 2018/0063020 A1 | 3/2018 | Bhagavatula et al. | |
| 2018/0316557 A1 | 11/2018 | Frangieh et al. | |
| 2020/0329511 A1 | 10/2020 | Yu et al. | |
| 2022/0046462 A1* | 2/2022 | De Andrade Jardim | H04L 47/283 |
| 2022/0312512 A1* | 9/2022 | Li | H04L 65/1016 |

FOREIGN PATENT DOCUMENTS

| | | |
|---|---|---|
| CN | 109246780 A | 1/2019 |
| CN | 109996346 A | 7/2019 |
| WO | 2019130048 A1 | 7/2019 |

OTHER PUBLICATIONS

"Transport of bridge management information in 5GS" SA WG2 Meeting #133, Qualcomm Incorporated, S2-1905221, May 13, 2019.

"Completing Ethernet port management" 3GPP TSG-SA WG2 Meeting #133, Qualcomm Incorporated, Mediatek Inc., S2-1908563, Jun. 23, 2019.

CN Office Action in Application No. 201910631594.9 Dated Dec. 1, 2021.

Written Opinion and International Search Report in Application No. PCT/CN2020/100417 Dated Jan. 27, 2022.

"Completing Ethernet port management" 3GPP TSG-SA WG2 Meeting #133, Qualcomm Incorporated, Mediatek, 82-1908535, Jun. 23, 2019.

"Introducing support for Ethernet port management" 3GPP TSG-SA WG2 Meeting #134, Qualcomm Incorporated, Mediatek, S2-1908541, Jun. 23, 2019.

"Introducing support for Ethernet port management" 3GPP TSG-SA WG2 Meeting #133, Qualcomm Incorporated, Mediatek Inc., S2-1908613, Jun. 23, 2019.

MediaTek Inc., "Discussion on the management information and TSN traffic transmitted over 5GS PDU session," SA WG2 Meeting #134, S2-1907350 (revision of S2-19nnnn), pp. 1-3, (Jun. 24-28, 2019).

"3rd Generation Partnership Project; Technical Specification Group Radio Access Network; NR; NR and NG-RAN Overall Description; Stage 2 (Release 15)," 3GPP TS 38.300 V15.6.0, pp. 1-96, (Jun. 2019).

KR Office Action dated Apr. 7, 2023 as received in Application No. 10-2022-7002102.

* cited by examiner

METHOD FOR SUPPORTING PORT ASSOCIATION, GATEWAY SELECTION METHOD, AND COMMUNICATIONS DEVICE

CROSS-REFERENCE TO RELATED APPLICATIONS

This application is a continuation application of International Application No. PCT/CN2020/100417 filed on Jul. 6, 2020, which claims priority to Chinese Patent Application No. 201910631594.9, filed in China on Jul. 12, 2019, which are incorporated herein by reference in their entireties.

TECHNICAL FIELD

Embodiments of this disclosure relate to the field of communications technologies, and in particular, to a method for supporting port association, a gateway selection method, and a communications device.

BACKGROUND

Many vertical industries have demands for time-sensitive communication. In the industrial Internet, there are time-sensitive data, such as robot instructions, that need to be executed sequentially within a specified time. However, network transmission resources are shared, so time-sensitive data cannot be supported due to delay and jitter in data transmission. Therefore, time-sensitive networking is proposed to support transmission of the time-sensitive data.

In time-sensitive networking, data may be forwarded through one or more bridges between a transmitting-end and a receiving-end of a time-sensitive data stream. A transmission medium for time-sensitive networking may be a wireless connection. Therefore, how to support formation of a bridge by using a wireless communications system is a technical problem that needs to be resolved urgently.

SUMMARY

Embodiments of this disclosure provide a method for supporting port association, a gateway selection method, and a communications device, so as to resolve the problem of how to support formation of a network bridge by using a wireless communications system.

To resolve the foregoing technical problem, this disclosure is implemented as follows.

According to a first aspect, an embodiment of this disclosure provides a method for supporting port association, applied to a first communications device and including:
performing a first operation.
The first operation includes at least one of the following:
determining a port corresponding to a port related information container;
determining a tunnel corresponding to a port related information container;
transmitting signaling related to the tunnel, where the signaling related to the tunnel includes a port related information container; or
transmitting a port related information container to the tunnel.

According to a second aspect, an embodiment of this disclosure provides a method for supporting port association, applied to a second communications device and including:
transmitting a port related information container and association information of a tunnel, where
the port related information container includes information related to a first port.

According to a third aspect, an embodiment of this disclosure provides a method for supporting port association, applied to a communications device and including:
causing a first communications device to perform a second operation.
The second operation includes at least one of the following:
determining a port corresponding to a port related information container; or
determining a tunnel corresponding to a port related information container, where
the port related information container includes information related to a first port, and the first port is a port of a second communications device.

According to a fourth aspect, an embodiment of this disclosure provides a method for supporting port association, applied to a third communications device and including:
receiving at least one of a first container or a second container; and
performing a third operation according to the received at least one of the first container or the second container.
The third operation includes at least one of the following:
determining a node related to the first container as a first node;
determining a node related to the second container as a second node;
transmitting the first container to a first node; or
transmitting the second container to a second node; where
the first container is used to transmit port related information of a port of the first node, and the second container is used to transmit port related information of a port of the second node.

According to a fifth aspect, an embodiment of this disclosure provides a gateway selection method, applied to a fourth communications device and including:
transmitting tunnel establishment request information, where
the tunnel establishment request information includes VLAN related information.

According to a sixth aspect, an embodiment of this disclosure provides a gateway selection method, applied to a fifth communications device and including:
receiving tunnel establishment request information; and
selecting a gateway according to the tunnel establishment request information, where
the tunnel establishment request information includes VLAN related information.

According to a seventh aspect, an embodiment of this disclosure provides a communications device, where the communications device is a first communications device, including:
a first execution module, configured to perform a first operation.
The first operation includes at least one of the following:
determining a port corresponding to a port related information container;
determining a tunnel corresponding to a port related information container;
transmitting signaling related to the tunnel, where the signaling related to the tunnel includes a port related information container; or transmitting a port related information container to the tunnel.

According to an eighth aspect, an embodiment of this disclosure provides a communications device, where the communications device is a second communications device, including:
- a first transmitting module, configured to transmit a port related information container and association information of a tunnel, where
- the port related information container includes information related to a first port.

According to a ninth aspect, an embodiment of this disclosure provides a communications device, including:
- a second execution module, configured to cause a first communications device to perform a second operation.

The second operation includes at least one of the following:
- determining a port corresponding to a port related information container;
- determining a tunnel corresponding to a port related information container;
- determining a tunnel n corresponding to a tunnel m; or
- determining a tunnel m corresponding to a tunnel n; where
- the port related information container includes information related to a first port, and the first port is a port of a second communications device.

According to a tenth aspect, an embodiment of this disclosure provides a communications device, where the communications device is a third communications device, including:
- a first receiving module, configured to receive at least one of a first container or a second container; and
- a third execution module, configured to perform a third operation according to the received at least one of the first container or the second container.

The third operation includes at least one of the following:
- determining a node related to the first container as a first node;
- determining a node related to the second container as a second node;
- transmitting the first container to a first node; or
- transmitting the second container to a second node, where
- the first container is used to transmit port related information of a port of the first node, and the second container is used to transmit port related information of a port of the second node.

According to an eleventh aspect, an embodiment of this disclosure provides a communications device, where the communications device is a fourth communications device, including:
- a second transmitting module, configured to transmit tunnel establishment request information, where
- the tunnel establishment request information includes virtual local area network VLAN related information.

According to a twelfth aspect, an embodiment of this disclosure provides a communications device, where the communications device is a fifth communications device, including:
- a second receiving module, configured to receive tunnel establishment request information; and
- a selection module, configured to select a gateway according to the tunnel establishment request information, where
- the tunnel establishment request information includes VLAN related information.

According to a thirteenth aspect, an embodiment of this disclosure provides a communications device, including a processor, a memory, and a program stored on the memory and capable of running on the processor. When the program is executed by the processor, the steps of the method for supporting port association according to the first aspect are implemented, or the steps of the method for supporting port association according to the second aspect are implemented, or the steps of the method for supporting port association according to the third aspect are implemented, or the steps of the method for supporting port association according to the fourth aspect are implemented, or the steps of the gateway selection method according to the fifth aspect are implemented, or the steps of the gateway selection method according to the sixth aspect are implemented.

According to a fourteenth aspect, an embodiment of this disclosure provides a computer-readable storage medium, where a computer program is stored in the computer-readable storage medium, and when the computer program is executed by a processor, the steps of the method for supporting port association according to the first aspect are implemented, or the steps of the method for supporting port association according to the second aspect are implemented, or the steps of the method for supporting port association according to the third aspect are implemented, or the steps of the method for supporting port association according to the fourth aspect are implemented, or the steps of the gateway selection method according to the fifth aspect are implemented, or the steps of the gateway selection method according to the sixth aspect are implemented.

In the embodiments of this disclosure, the first communications device can be made to determine the port or tunnel corresponding to the port related information container, so as to accurately transmit the received container.

BRIEF DESCRIPTION OF DRAWINGS

Other advantages and benefits will become apparent to those of ordinary skill in the art by reading detailed description of the exemplary embodiments below. The accompanying drawings are merely intended to illustrate the purposes of the preferred implementations, and should not be construed as a limitation on this disclosure. Throughout the accompanying drawings, the same reference numerals represent the same components. In the drawings.

DESCRIPTION OF EMBODIMENTS

A method for supporting port association and a communications device provided in the embodiments of this disclosure may be applied to a wireless communications system. The wireless communications system may be a fifth-generation (5G) mobile communications system, or an evolved packet system (EPS), or a later evolved communications system. A wireless communications network in the embodiments of this disclosure may be a fifth-generation mobile communications network or an LTE network. The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by a person of ordinary skill in the art based on the embodiments of this disclosure shall fall within the protection scope of this disclosure.

Figure 1:
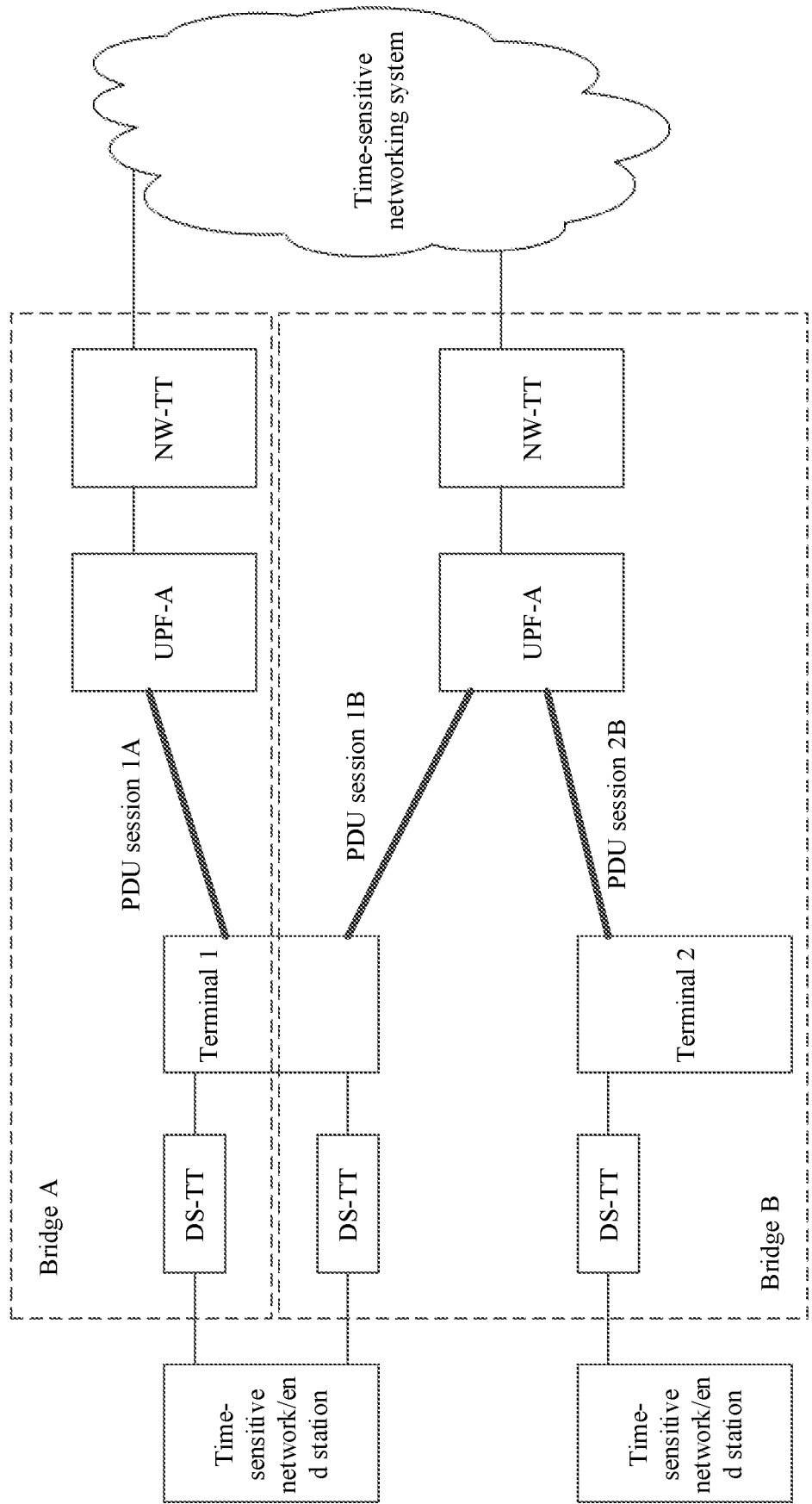
FIG. 1 is a schematic architectural diagram of a wireless communications system according to an embodiment of this disclosure.

FIG. 1 is a schematic architectural diagram of a wireless communications system according to an embodiment of this disclosure.

In this embodiment of this disclosure, a transmitting end of a time-sensitive data stream may be referred to as talker, and a receiving end of the time-sensitive data stream may be referred to as listener. Data may be forwarded through one or more bridges between the talker and the listener. An end station may be a talker or a listener. The bridge is responsible for data transmission between the talker and the listener.

User equipment (UE), a time-sensitive adapter, and a wireless communications network form a bridge (referred to as a first bridge hereinafter). For downlink data, a first adapter is an egress port of the bridge, and a second adapter is an ingress port of the bridge. For uplink data, the first adapter is an ingress port of the bridge, and the second adapter is an egress port of the bridge.

The first adapter is a time-sensitive networking adapter at device side (such as at UE side) (such as a DS-TT Device-side TSN translator). A port of the first adapter may be used to connect to another bridge or end station. The second adapter is a time-sensitive networking adapter at network side (such as an NW-TT Network-side TSN translator). A port of the second adapter may be used to connect to another bridge or end station.

The first adapter and/or the second adapter may be a time-sensitive networking adapter(s). The time-sensitive networking adapter may also be referred to as a time-sensitive networking translator (TSN TRANSLATOR).

The UE may be combined with the first adapter. A user plane function (UPF) may be combined with the second adapter.

The UE may act as a proxy for the first adapter to establish a protocol data unit (PDU) session with the UPF. Through the PDU session, a port on the first adapter is associated with a port on the second adapter on the UPF. The port of the first adapter becomes a port of a first bridge.

To support the wireless communications system to form a bridge, the following questions must be solved.

Question 1: Through an AF, a bridge management node may obtain related information of ports of a bridge formed by a wireless communications system, or configure ports of the bridge formed by the wireless communications system. The ports of the bridge formed by the wireless communications system are on a DS-TT and an NW-TT. To reduce impact on the wireless communications system, when the DS-TT and the NW-TT exchange information with the AF, the information is transmitted through a port related information container. The container may be transparent to both the UE and the network. When the DS-TT is to transmit the port related information container to the AF, the UE needs to initiate a PDU session modification request, carrying the port related information container to an SMF, and the SMF then forwards the request to the AF through a PCF. Because the port related information container is transparent to the UE, and there is a one-to-one association relationship between PDU sessions and ports on the DS-TT, only the port related information container cannot enable the UE to uniquely determine the PDU session.

Question 2: A DS-TT and an NW-TT now use a same container when transmitting port related information. However, both the DS-TT and the NW-TT may transmit the port related information. When the SMF receives two identical containers, and reports them to the AF through the PCF, the two identical containers cannot be combined into one container. In addition, the AF may transmit the port related information to both the DS-TT and the NW-TT. If there is only one container, the container may have to be transmitted in twice one by one, triggering two PDU sessions related procedures, which prolongs delay of port configuration and increases signaling overheads.

Question 3: When UE accesses a network to establish a PDU session on a port, it needs to select a UPF according to a DNN related to a TSN network. Before an access to a DS-TT, ports of an NW-TT on the UPF have already been configured (such as a static filtering entry). Different NW-TT ports of different UPFs may belong to different virtual local area networks (VLAN). A plurality of DW-TTs that are connected by the UE may also belong to different VLANs. In order to be able to select a UPF under a same VLAN, the UE should provide VLAN information when establishing a PDU session.

In the embodiments of this disclosure, optionally, obtaining may be understood as acquiring from configuration, receiving, obtaining through receiving upon a request, obtaining through self-learning, obtaining through deduction based on non-received information, or obtaining through processing received information, which may be determined according to actual needs. This is not limited in the embodiments of this disclosure. For example, when indication information of a given capability is not received from a device, it can be derived that the device does not support this capability.

Optionally, transmitting may include broadcasting, broadcasting in a system message, and a return in response to a request.

In an embodiment of this disclosure, the port may be an Ethernet port.

In an optional embodiment of this disclosure, a VLAN identification may also be referred to as a VLAN tag (such as a C-TAG and/or S-TAG).

In an optional embodiment of this disclosure, the port related information container may also be referred to as a port management information container.

In an optional embodiment of this disclosure, the port related information may also be referred to as port related control information or port related management information.

In an optional embodiment of this disclosure, the tunnel may include but is not limited to one of the following: a PDU session, a PDN connection, a QoS flow, a bearer (for example, an ERAB, a RAB, a DRB, and an SRB), an IPsec tunnel.

In an optional embodiment of this disclosure, the port control information may be understood as all port related information managed by the bridge (such as port related configuration information in 802.1Q bridge management).

In an optional embodiment of this disclosure, the wireless communications network may be simply referred to as a network.

In an embodiment of this disclosure, the wireless communications network may be at least one of the following: a public network or a non-public network.

The non-public network may be referred to as a non-public communications network. The non-public network may include at least one of the following deployment manners: standalone non-public network (such as a SNPN) and non-standalone non-public network (such as a closed access group (CAG)). In an embodiment of this disclosure, the non-public network may include or be referred to as a private network. The private network may be referred to one of the following: a private communications network, a private network, a local area network (LAN), a private virtual network (PVN), an isolated communications network, a dedicated communications network, or other names. It should be noted that a naming manner is not specifically limited in the embodiments of this disclosure.

The public network may be referred to as one of the following: a public communications network or other names. It should be noted that a naming manner is not specifically limited in the embodiments of this disclosure.

In an optional embodiment of this disclosure, the communications device may include at least one of the following: a communications network element and a terminal.

In an embodiment of this disclosure, the communications network element may include at least one of the following: a core network element and a radio access network network element.

In the embodiments of this disclosure, a core network element (CN element) may include but is not limited to at least one of the following: a core-network device, a core-network node, a core-network function, a core-network network element, a mobility management entity (MME), an access mobility management function (AMF), a session management function (SMF), a user plane function (UPF), a serving gateway (SGW), a PDN gateway (PDN), a policy control function (PCF), a policy and charging rules function (PCRF), a GPRS serving support node (SGSN), a gateway GPRS support node (GGSN), unified data management (UDM), unified data repository (UDR), a home subscriber server (HSS), and an application function (AF).

In the embodiments of this disclosure, a radio access network (RAN) network element may include but is not limited to at least one of the following: a radio access networks device, a radio access network node, a radio access network function, a radio access network unit, a third generation partnership project (3GPP) radio access network, a non-3GPP radio access network, a centralized unit (CU), a distributed unit (DU), a base station, an evolved NodeB (eNB), a 5G base station (gNB), a radio network controller (RNC), a NodeB, a non-3GPP interworking function (N3IWF), an access controller (AC) node, an access point (AP) device, and a wireless local area network (WLAN) node.

The base station may be a base transceiver station (BTS) in a global system for mobile communications (GSM) or code division multiple access (CDMA), or may be a NodeB in wideband code division multiple access (WCDMA), or may be an evolved NodeB (eNB, e-NodeB, or evolved Node B) in LTE or a 5G base station (gNB). This is not limited in the embodiments of this disclosure.

In the embodiments of this disclosure, UE is a terminal. The terminal may include a relay that supports a terminal function, and/or a terminal that supports a relay function. The terminal may also be referred to as a terminal device or user equipment (UE). The terminal may be a terminal-side device such as a mobile phone, a tablet computer (Tablet Personal Computer), a laptop computer, a personal digital assistant (PDA), a mobile internet device (MID), a wearable device, or an in-vehicle device. It should be noted that a specific type of the terminal is not limited in this embodiment of this disclosure.

In the specification and claims of this application, the terms "including", and any other variants mean to cover a non-exclusive inclusion. For example, a process, method, system, product, or device that includes a list of steps or units is not necessarily limited to those steps or units, but may include other steps or units not expressly listed or inherent to such a process, method, product, or device. In addition, in the specification and claims, the use of "and/or" represents presence of at least one of the connected objects, for example, "A and/or B" indicates that the following three cases: only A, only B, or both A and B.

In the embodiments of this disclosure, the terms such as "an example" or "for example" are used to represent an example, an illustration, or a description. Any embodiment or design solution described as "an example" or "for example" in the embodiments of this disclosure shall not be interpreted to be more preferential or advantageous than other embodiments or design solutions. To be precise, the terms such as "example" or "for example" are intended to present a related concept in a specific manner.

Technologies described in this specification are not limited to a fifth-generation mobile communication technology (5G) system, a later evolved communications system, and an LTE/LTE advanced (LTE-A) system, and may also be applied to various wireless communications systems, for example, code division multiple access (CDMA), time division multiple access (TDMA), frequency division multiple access (FDMA), orthogonal frequency division multiple access (OFDMA), single-carrier frequency-division multiple access (SC-FDMA), and other systems.

The terms "system" and "network" are usually used interchangeably. The CDMA system may implement radio technologies such as CDMA2000 and universal terrestrial radio access (UTRA). UTRA includes wideband CDMA (WCDMA) and other CDMA variants. The TDMA system may implement radio technologies such as global system for mobile communications (GSM). The OFDMA system may implement radio technologies such as ultra mobile broadband (UMB), evolved UTRA (E-UTRA), IEEE 802.11 (Wi-Fi), IEEE 802.16 (WiMAX), IEEE 802.20, and Flash-OFDM. UTRA and E-UTRA are part of the universal mobile telecommunications system (UMTS). LTE and more advanced LTEs (such as LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The technologies described herein are applicable not only to the above-mentioned systems and radio technologies, but also to other systems and radio technologies.

The following describes the method for supporting port association in the embodiments of this disclosure.

Figure 2:
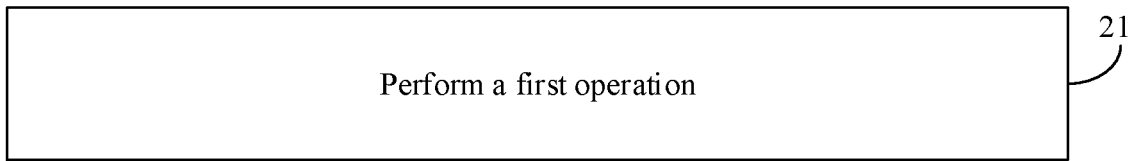
FIG. 2 is a schematic flowchart of a method for supporting port association according to an embodiment of this disclosure.

Referring to FIG. 2, an embodiment of this disclosure provides a method for supporting port association, applied to a first communications device, where the first communications device includes but is not limited to UE. As shown in FIG. 2, the method includes the following steps.

Step 21: Perform a first operation.

The first operation may include at least one of the following:
  determining a port corresponding to a port related information container;
  determining a tunnel corresponding to a port related information container, where the tunnel for example is a protocol data unit (PDU) session;
  transmitting signaling related to the tunnel (that is, a tunnel corresponding to the port related information container), where the signaling related to the tunnel includes a port related information container, and the signaling related to the tunnel for example is a PDU session modification request; or
  transmitting a port related information container to the tunnel (that is, the tunnel corresponding to the port related information container).

In an implementation, the port corresponding to the port related information container may be determined first, and then the tunnel corresponding to the port related information container may be determined based on the tunnel corresponding to the determined port. The port corresponding to the port related information container can be understood as the port corresponding to the port related information included in the port related information container.

It is not difficult to understand
  a port corresponding to a port related information container, for example, if the port related information container includes port related information of port A, the port corresponding to the port related information container is port A; and
  a tunnel corresponding to a port related information container, for example, if the port related information container includes port related information of port A and a tunnel corresponding to port A is tunnel X, the tunnel corresponding to the container is tunnel X.

In some implementations, the performing a first operation may include: receiving information transmitted by a second communications device; and performing the first operation according to the information transmitted by the second communications device. Optionally, the second communications device includes but is not limited to a first adapter (DS-TT).

In some implementations, the performing a first operation may include: receiving the port related information container and information related to the tunnel; and performing the first operation according to the information related to the tunnel, where the port related information container includes information related to a first port.

In some implementations, the port related information container is a first container of port related information (a first container), where the first container is used to include and/or transmit port related information of a port of a first node (such as a DS-TT); and the first port is a port of the first node. The first container may be different from a second container of port related information (a second container). The second container is used to transmit port related information of a port of a second node (such as an NW-TT).

In some implementations, the information related to the first port may be the port related information. Optionally, the port related information may include but is not limited to at least one of the following: request information for port related information, a port identification, service type information, first routing information, information related to priority regeneration, information related to port transmission rate, information related to bandwidth availability parameter, and information related to transmission selection algorithm, port management capabilities, information related to a bridge delay (such as transmission propagation delay), traffic class table, gate control information, port neighbor discovery configuration, and the like.

In some implementations, the port may be a port on the first adapter (such as a DS-TT).

In some other implementations, the port may alternatively be a port on the second adapter (such as an NW-TT).

In some implementations, the information related to the tunnel may include at least one of the following:
  identification information of a port or identification information of the tunnel (such as an identification of a PDU session).

Optionally, the identification information of the port may be port identification information of the first port.

The identification information of the tunnel may be identification information of a tunnel corresponding to the first port.

Optionally, the port identification information may include at least one of the following: a bridge identification, a port number, and a MAC address of the port. It is not difficult to understand that a plurality of ports on the first adapter and/or the second adapter may be connected to a plurality of bridges. A port can be uniquely identified by using a bridge identification and a port number. In an implementation, when a port related tunnel is established, the second communications device has already provided a MAC address of a port. The first communications device may save an association relationship between the MAC address of the port and an identification of the related tunnel. Later when the port related information container is to be transmitted, the MAC address of the port may be transmitted together. It is not difficult to understand that the related tunnel may be indexed according to the MAC address of the port.

In an implementation, the first communications device saves the port and information of the tunnel corresponding to the port. The first communications device may be related to the tunnel corresponding to the port according to the identification information of the port. In another implementation, the first communications device may be directly related to the tunnel corresponding to the container according to the identification information of the tunnel. It is not difficult to understand that the container is transparent to the first communications device, without association information of a tunnel, the tunnel corresponding to the container or port cannot be identified, and the received container cannot be transmitted.

In at least one embodiment of this disclosure, before the receiving the port related information container and information related to the tunnel, the method further includes:

transmitting the identification information of the tunnel, where the tunnel is a tunnel corresponding to the first port.

In an implementation, after the tunnel corresponding to the port is established, the first communications device can transmit the identification information of the tunnel to the second communications device. It is not difficult to understand that later when transmitting the port related information container to the first communications device, the second communications device can transmit the information related to the tunnel to the first communications device. For example, when the tunnel is a PDU session, the identification information of the tunnel is an identification of the PDU session. The identification of the PDU session may be, after the port related PDU session has been successfully established, an identification of the port related PDU session, which is transmitted by the first communications device (such as UE) to the second communications device (such as a DS-TT).

It is not difficult to understand that through this embodiment, the first communications device can be made to determine the port or tunnel corresponding to the port related information container, so as to accurately transmit the received container.

Figure 3:
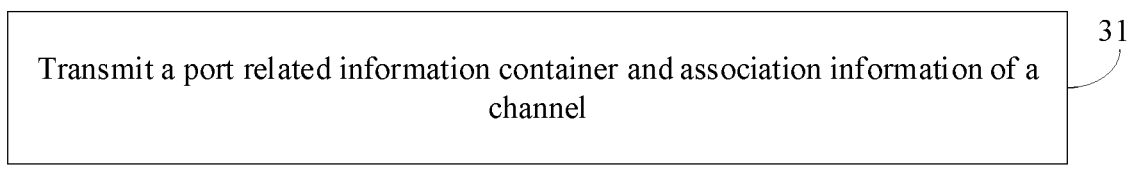
FIG. 3 is a schematic flowchart of a method for supporting port association according to another embodiment of this disclosure.

Referring to FIG. 3, an embodiment of this disclosure provides a method for supporting port association, applied to a second communications device, where the second communications device includes but is not limited to a first adapter (DS-TT). As shown in FIG. 3, the method includes the following steps.

Step 31: Transmit a port related information container and association information of a tunnel, where the port related information container includes information related to a first port.

In some implementations, the port related information container is a first container of port related information (a first container), where the first container is used to include and/or transmit port related information of a port of a first node (such as a DS-TT); and the first port is a port of the first node. The first container may be different from a second container of port related information (a second container). The second container is used to transmit port related information of a port of a second node (such as an NW-TT).

In some implementations, the port may be a port on the first adapter. In some other implementations, the port may alternatively be a port on the second adapter.

In some implementations, the information related to the tunnel may include at least one of the following:

identification information of a port or identification information of the tunnel (such as an identification of a PDU session).

Optionally, the identification information of the port may be port identification information of the first port.

The identification information of the tunnel may be identification information of a tunnel corresponding to the first port.

Optionally, the port identification information may include at least one of the following: a bridge identification, a port number, and a MAC address of the port. It is not difficult to understand that a plurality of ports on the first adapter and/or the second adapter may be connected to a plurality of bridges. A port can be uniquely identified by using a bridge identification and a port number. In an implementation, when a port related tunnel is established, the second communications device has already provided a MAC address of a port. The first communications device may save an association relationship between the MAC address of the port and an identification of the related tunnel. Later when the port related information container is to be transmitted, the MAC address of the port may be transmitted together. It is not difficult to understand that the related tunnel may be indexed according to the MAC address of the port.

In at least one embodiment of this disclosure, before the foregoing step 31, the method may further include:

receiving identification information of the tunnel, where the tunnel is a tunnel corresponding to the first port.

In an implementation, after the tunnel (such as a PDU session) corresponding to the port is established, the second communications device can receive the identification information of the tunnel corresponding to the port, which is transmitted by the first communications device. The second communications device may save the association relationship between the port and the tunnel corresponding to the port. Later, when it is required to transmit the port related information on the second communications device, the second communications device may transmit the association information of the tunnel corresponding to the port. For example, when the tunnel is a PDU session, the identification information of the tunnel is an identification of the PDU session. The identification of the PDU session may be, after the port related PDU session has been successfully established, an identification of the PDU session corresponding to the port, which is received by the second communications device (such as a DS-TT) from the first communications device (such as UE).

It is not difficult to understand that through this embodiment, with the port related information container and the association information of the tunnel that are transmitted by the second communications device, the first communications device can be made to determine the port or tunnel corresponding to the port related information container, so as to accurately transmit the received container.

Figure 4:
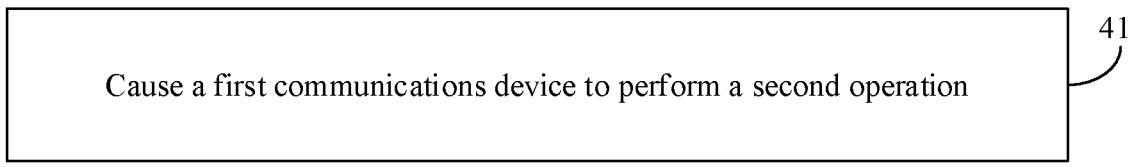
FIG. 4 is a schematic flowchart of a method for supporting port association according to yet another embodiment of this disclosure.

Referring to FIG. 4, an embodiment of this disclosure provides a method for supporting port association, applied to a communications device, where the communications device includes but is not limited to the foregoing first communications device (such as UE) or the second communications device (such as a DS-TT). As shown in FIG. 4, the method includes the following steps.

Step 41: Cause a first communications device to perform a second operation.

The second operation may include at least one of the following:

determining a port corresponding to a port related information container;

determining a tunnel corresponding to a port related information container, for example, the tunnel is a PDU session;

determining a tunnel n corresponding to a tunnel m (the tunnel m for example is a tunnel m that receives the port related information container (received through related signaling or in a tunnel)); or determining a tunnel m corresponding to a tunnel n (the tunnel n for example is a tunnel n that receives the port related information container (received through related signaling or in a tunnel)), where the port related information container includes information related to a first port, and the first port is a port of a second communications device (such as a DS-TT).

It is not difficult to understand a port corresponding to a port related information container, for example, if the port related information container includes port related information of port A, the port corresponding to the port related information container is port A;

a port corresponding to a port related information container, for example, if the port related information container includes port related information of port A and a tunnel corresponding to port A is tunnel X, the tunnel corresponding to the container is tunnel X; and a tunnel m corresponding to a tunnel n and a tunnel n corresponding to a tunnel m, for example, if a port corresponding to a tunnel m is the same as a port corresponding to a tunnel n, it may be considered that the tunnel m corresponds to the tunnel n, or the tunnel n corresponds to the tunnel m.

In at least one embodiment of this disclosure, optionally, the foregoing step 41 may include at least one of the following:

requesting to establish the tunnel m corresponding to a first port, for example, the tunnel may be requested and established by the first communications device or the second communications device;

establishing the tunnel m corresponding to a first port, for example, the tunnel may be established by the first communications device or the second communications device;

saving an association relationship between a first port and a tunnel m;

receiving a port related information container for the first port in a tunnel m or signaling related to a tunnel m; or transmitting a port related information container for the first port in a tunnel m or signaling related to a tunnel m, where the tunnel m is a tunnel between the first communications device and the second communications device.

It can be understood that there may be one or more tunnels between the first communications device and the second communications device. One port is related only to one tunnel m.

In an implementation, when the tunnel m corresponding to the first port is established, port identification information of the first port may be transmitted.

The port identification information is described in FIG. 2, and details are not described herein again.

Further, the foregoing step 41 may further include the following step (the following step may be performed by the first communications device):

determining at least one of the following based on at least one of the tunnel m related to the port related information container, an association relationship between the tunnel m and the first port, or an association relationship between the tunnel n (such as a PDU session) and the first port:

determining that a port corresponding to the port related information container is the first port;

determining the tunnel n corresponding to the port related information container; or determining the tunnel n corresponding to the tunnel m.

In some implementations, signaling related to the tunnel m may carry the port related information container; alternatively, the port related information container may be received from the tunnel m. It is not difficult to understand that based on the association relationship between the tunnel m and the first port, and the association relationship between the tunnel n and the first port, the tunnel n corresponding to the port related information container may be determined, or the tunnel n corresponding to the tunnel m may be determined. Thereby, it may be determined that signaling related to which tunnel n or which tunnel n is to be used for transmitting the port related information container received from the tunnel m.

Or further, the foregoing step 41 may further include the following step (the following step may be performed by the first communications device):

determining at least one of the following based on at least one of the tunnel n related to the port related information container, an association relationship between the tunnel m and the first port, or an association relationship between the tunnel n and the first port:

determining that a port corresponding to the port related information container is the first port;

determining the tunnel m corresponding to the port related information container; or determining the tunnel m corresponding to the tunnel n, where the foregoing tunnel n is a tunnel between the first communications device and a wireless communications network (such as a 5G network), and the tunnel n for example is a PDU session.

In some implementations, signaling related to the tunnel n (PDU session modification request) may carry the port related information container; alternatively, the port related information container may be received from the tunnel n. It is not difficult to understand that based on the association relationship between the tunnel m and the first port, and the association relationship between the tunnel n and the first port, the tunnel m corresponding to the port related information container from the tunnel n may be determined, or the tunnel m corresponding to the tunnel n may be determined. Thereby, it may be determined that signaling related to which tunnel m or which tunnel m is to be used for transmitting the port related information container received from the tunnel n.

Figure 5:
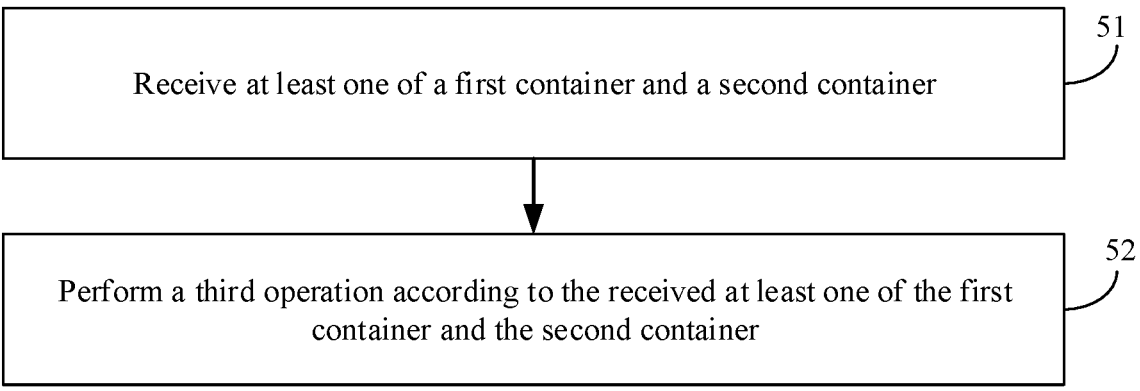
FIG. 5 is a schematic flowchart of a method for supporting port association according to yet another embodiment of this disclosure.

Referring to FIG. 5, an embodiment of this disclosure further provides a method for supporting port association, applied to a third communications device, where the third communications device includes but is not limited to any one of the following: SMF, PCF, AMF, or AF. As shown in FIG. 5, the method includes the following steps.

Step 51: Receive at least one of a first container or a second container.

Step 52: Perform a third operation according to the received at least one of the first container or the second container.

The third operation may include at least one of the following:

determining a node related to the first container as a first node;

determining a node related to the second container as a second node;

transmitting the first container to a first node; or transmitting the second container to a second node.

The first container is an abbreviation of a first container of port related information, configured to transmit port related information of a port of the first node, and the second container is an abbreviation of a second container of port related information, configured to transmit port related information of a port of the second node.

In an implementation, the first container and the second container are different containers. It is not difficult to understand that it can be known according to the first container that the first container is related to the first node, and it can be known according to the second container that the second container is related to the second node.

In some implementations, the first node may include a first adapter (such as a DS-TT).

In some implementations, the second node may include a second adapter (such as an NW-TT).

It is not difficult to understand that through this embodiment, with the first container and the second container that are different, operations on port related information of ports on the first node and the second node can be completed through a single tunnel signaling process, thereby shortening delay of port configuration and reducing signaling overheads.

Figure 6:
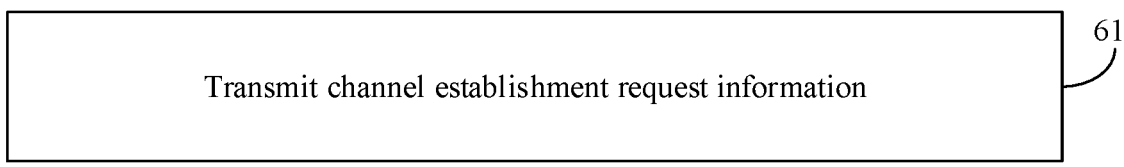
FIG. 6 is a schematic flowchart of a method for supporting port association according to yet another embodiment of this disclosure.

Referring to FIG. 6, an embodiment of this disclosure further provides a gateway selection method, applied to a fourth communications device, where the fourth communications device includes but is not limited to UE. As shown in FIG. 6, the method includes the following steps.

Step 61: Transmit tunnel establishment request information.

The tunnel establishment request information is used to request establishment of a port related tunnel (such as a PDU session), and the corresponding tunnel establishment request optionally is a PDU session establishment request. Tunnel establishment request information may be included in tunnel establishment request signaling (a PDU session establishment request).

The tunnel establishment request information may include VLAN related information.

In an implementation, the tunnel establishment request information is establishment request information for a port related tunnel. To be specific, the tunnel requested to be established is for the port to connect to a wireless communications network and become a port of a bridge formed by the wireless communications system.

Optionally, the VLAN related information may include at least one of the following:
 a DNN corresponding to a VLAN (that is, different VLANs correspond to different DNNs); or
 VLAN identification information (such as a VID (or may be referred to as VLAN Tag)).

In an implementation, after the fourth communications device has transmitted the VLAN related information to a fifth communications device through the tunnel establishment request information, the fifth communications device may select a gateway according to the VLAN related information.

It is not difficult to understand that through this embodiment, the requirement of selecting a gateway (such as a UPF) in the same VLAN can be met when the tunnel is established.

Figure 7:
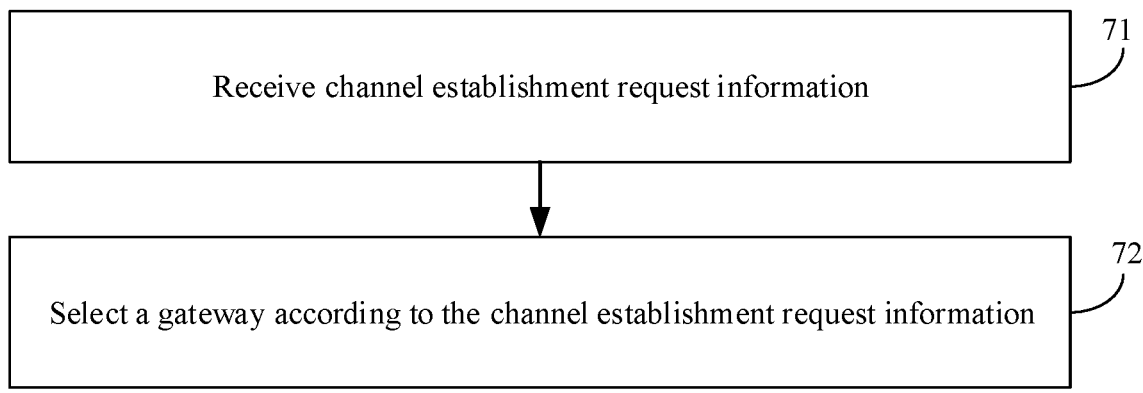
FIG. 7 is a schematic flowchart of a method for supporting port association according to yet another embodiment of this disclosure.

Referring to FIG. 7, an embodiment of this disclosure further provides a gateway selection method, applied to a fifth communications device, where the fifth communications device includes but is not limited to any one of the following: SMF, PCF, AMF, or AF. As shown in FIG. 7, the method includes the following steps.

Step 71: Receive tunnel establishment request information.

Step 72: Select a gateway according to the tunnel establishment request information.

The tunnel establishment request information includes VLAN related information. A tunnel corresponding to the tunnel establishment request information optionally is a PDU session, and the corresponding tunnel establishment request optionally is a PDU session establishment request.

In an implementation, the tunnel establishment request information is establishment request information for a port related tunnel. To be specific, the tunnel requested to be established is for the port to connect to a wireless communications network and become a port of a bridge formed by the wireless communications system.

Optionally, the VLAN related information may include at least one of the following:
 a DNN corresponding to a VLAN; or
 VLAN identification information (such as a VID).

In at least some embodiments of this disclosure, the foregoing step 72 may include: selecting, according to the VLAN related information, a gateway that supports the VLAN. It can be understood that the gateway optionally is a UPF.

With reference to specific application scenarios, the following describes a method for supporting port association in the embodiments of this disclosure.

Figure 8:
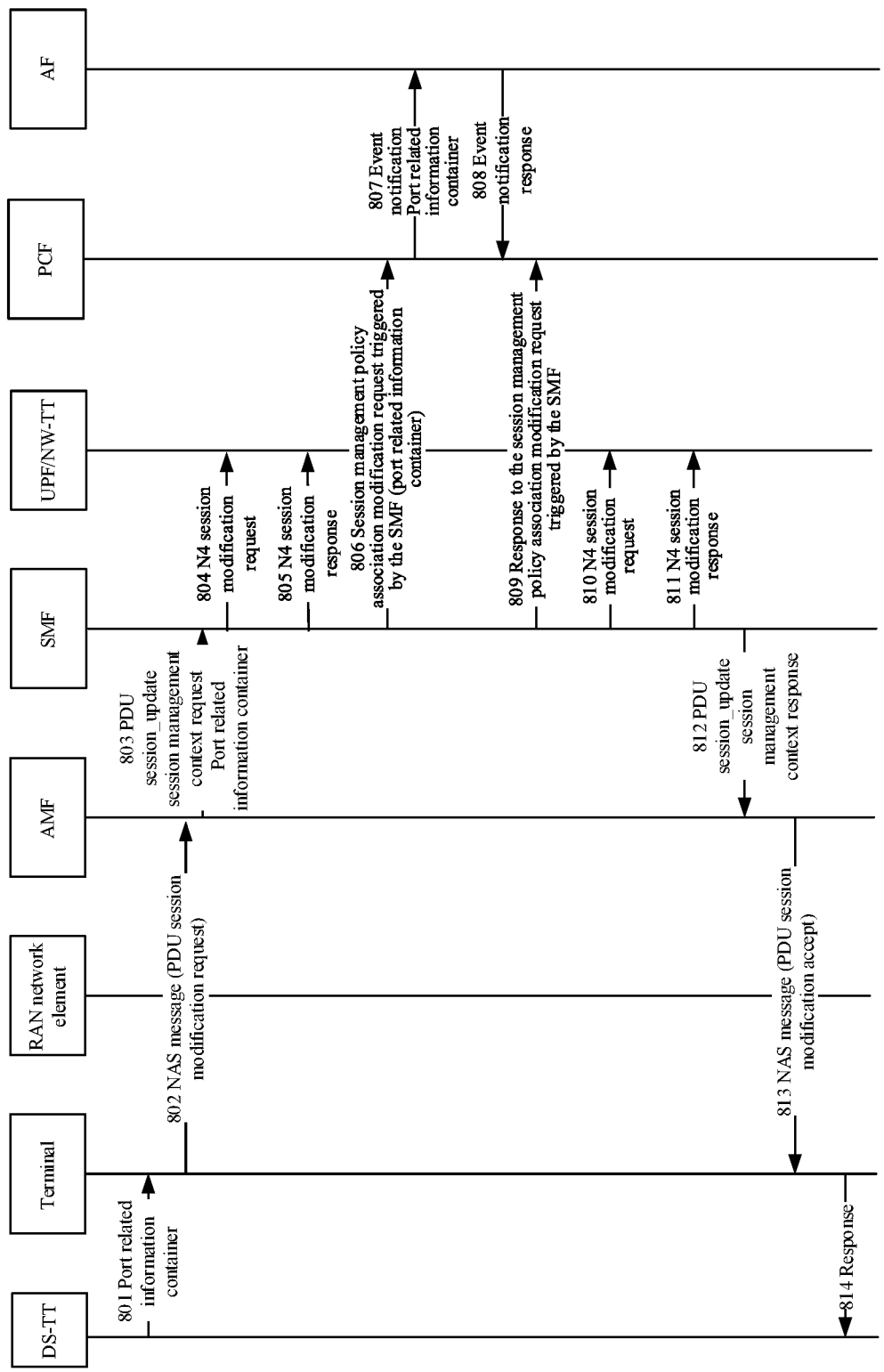
FIG. 8 is a schematic flowchart of a method for supporting port association in an application scenario 1 and an application scenario 2 according to an embodiment of this disclosure.

The application scenario 1 in this embodiment of this disclosure mainly describes a PDU (protocol data unit) session modification procedure triggered by UE. Referring to FIG. 8, the procedure includes the following steps.

Step 801: A DS-TT transmits a port related information container and association information of a tunnel (such as a PDU session) to UE. The port related information container includes port related information of a port on the DS-TT (as described in the embodiment of FIG. 2), and information included in the information related to the tunnel may be as described in the embodiment of FIG. 2.

Step 802: In an implementation, the UE may determine a PDU session corresponding to the port related information container based on the information associated with the PDU session (as described in the embodiment of FIG. 2).

The UE initiates a PDU session modification request to an AMF. The PDU session modification request includes the port related information container in step 801.

In an implementation, the UE may transmit the PDU session modification request to the AMF through a NAS message.

Step 803: The AMF transmits a PDU session_update session management context request to an SMF. The PDU session_update session management context request includes the PDU session modification request.

Step 804: Optionally, the SMF transmits an N4 session modification request to a UPF.

Step 805: Optionally, the UPF transmits an N4 session modification response to the SMF.

Step 806: The SMF transmits a session management policy association modification request triggered by the SMF to the PCF. The session management policy association modification request triggered by the SMF includes the port related information container.

Step 807: A PCF transmits an event notification to an AF. The event notification includes the port related information container. After receiving the port related information in the port related information container, the AF transmits the port related information to a time-sensitive networking control node (such as a CNC). Optionally, the CNC needs to adjust the port related information, and the CNC may transmit the updated port related information to the AF. The AF may generate a port related information container to include the port related information.

Step 808: The AF transmits an event notification response to the PCF. Optionally, the event notification response includes the port related information container. The port related information container may include port related information of a port on the DS-TT and/or an NW-TT (as described in the embodiment of FIG. 2). The port related information in step 806 may be different from the port related information in step 801.

Step 809: The PCF transmits a response to the session management policy association modification request triggered by the SMF to the SMF. Optionally, the response to the session management policy association modification request triggered by the SMF includes the port related information container in step 806.

The SMF determines whether the port related information container is a container related to an NW-TT port or to a DS-TT port. When it is determined as a container related to an NW-TT port, the container is transmitted to the UPF through step 808. When it is determined as a container related to a DS-TT port, step 810 is performed.

Step 810: The SMF transmits an N4 session modification request to the UPF. The N4 session modification request includes the port related information container in step 808. When the UPF and the NW-TT are combined, the UPF and/or the NW-TT may perform a port related operation on a port of the NW-TT according to the port related information in the port related information container (as described in the embodiment of FIG. 2, and details are not described herein again).

Step 811: The UPF transmits an N4 session modification response to the SMF.

Step 812: The SMF transmits a PDU session_update session management context response to the AMF. The PDU session_update session management context response includes a PDU session modification accept. Optionally, the PDU session modification accept includes the port related information container.

Step 813: The AMF transmits a NAS message to the UE. The NAS message includes the PDU session modification accept.

Step 814: The UE transmits a response to the DS-TT. Optionally, the response includes the port related information container. The DS-TT may perform a port related operation on a port of the DS-TT according to the port related information in the port related information container (as described in the embodiment of FIG. 2, and details are not described herein again).

The application scenario 2 in this embodiment of this disclosure mainly describes a PDU (protocol data unit) session modification procedure triggered by UE. In this procedure, a DS-TT may transmit and receive a first container, and an NW-TT may transmit and receive a second container. Referring to FIG. 8, the procedure includes the following steps.

Step 801: The DS-TT transmits a first container (a first container of port related information) and association information of a tunnel (a PDU session) to UE. The first container includes port related information of a port on the DS-TT (as described in the embodiment of FIG. 2).

UE associates an established PDU session according to information associated with the PDU session, and transmits a PDU session modification request, where the request to modify the PDU session includes the first container.

Step 802: The UE initiates a PDU session modification request to an AMF. The PDU session modification request includes the first container in step 801.

The UE may transmit the PDU session modification request to the AMF through a NAS message.

Step 803: The AMF transmits a PDU session_update session management context request to an SMF. The PDU session_update session management context request includes the PDU session modification request.

Step 804: The SMF transmits an N4 session modification request to a UPF.

Step 805: The UPF transmits an N4 session modification response to the SMF. The N4 session modification response may include a second container. The second container includes port related information of a port on the NW-TT (as described in the embodiment of FIG. 2).

Step 806: The SMF transmits a session management policy association modification request triggered by the SMF to the PCF. The session management policy association modification request triggered by the SMF includes the first container and/or the second container.

Step 807: A PCF transmits an event notification to an AF. The event notification includes the port related information container. After receiving the port related information in the first container and/or the second container, the AF transmits the port related information to a time-sensitive networking control node (such as a CNC). Optionally, the CNC needs to adjust the port related information, and the CNC may transmit the updated port related information to the AF. The AF may generate the first container and/or the second container to include the port related information.

Step 808: The AF transmits an event notification response to the PCF. Optionally, the event notification response includes the first container and/or the second container. The first container may include port related information of a DS-TT port (as described in the embodiment of FIG. 2). The second container may include port related information of an NW-TT port (as described in the embodiment of FIG. 2). The port related information in the first container in step 808 may be different from the port related information in the first container in step 801. The port related information in the second container in step 808 may be different from the port related information in the second container in step 805.

Step 809: The PCF transmits a response to the session management policy association modification request triggered by the SMF to the SMF. Optionally, the response to the session management policy association modification request triggered by the SMF includes the first container and/or the second container in step 808.

The SMF determines that the first container is a container related to a DS-TT port. The SMF transmit the first container in step 810 (specifically as described in FIG. 5).

The SMF determines that the second container is a container related to an NW-TT port, and the SMF transmit the second container to the UPF through step 808 (specifically as described in FIG. 5).

Step 810: The SMF transmits an N4 session modification request to the UPF. The N4 session modification request includes the second container in step 808. When the UPF and the NW-TT are combined, the UPF and/or the NW-TT may perform a port related operation on a port of the NW-TT according to the port related information in the second container (as described in the embodiment of FIG. 2, and details are not described herein again).

Step 811: The UPF transmits an N4 session modification response to the SMF.

Step 812: The SMF transmits a PDU session_update session management context response to the AMF. The PDU session_update session management context response includes a PDU session modification accept. Optionally, the PDU session modification accept includes the first container.

Step 813: The AMF transmits a NAS message to the UE. The NAS message includes the PDU session modification accept.

Step 814: The UE transmits a response to the DS-TT. Optionally, the response includes the first container. The DS-TT may perform a port related operation on a port of the DS-TT according to the port related information in the first container (as described in the embodiment of FIG. 2, and details are not described herein again).

Figure 9:
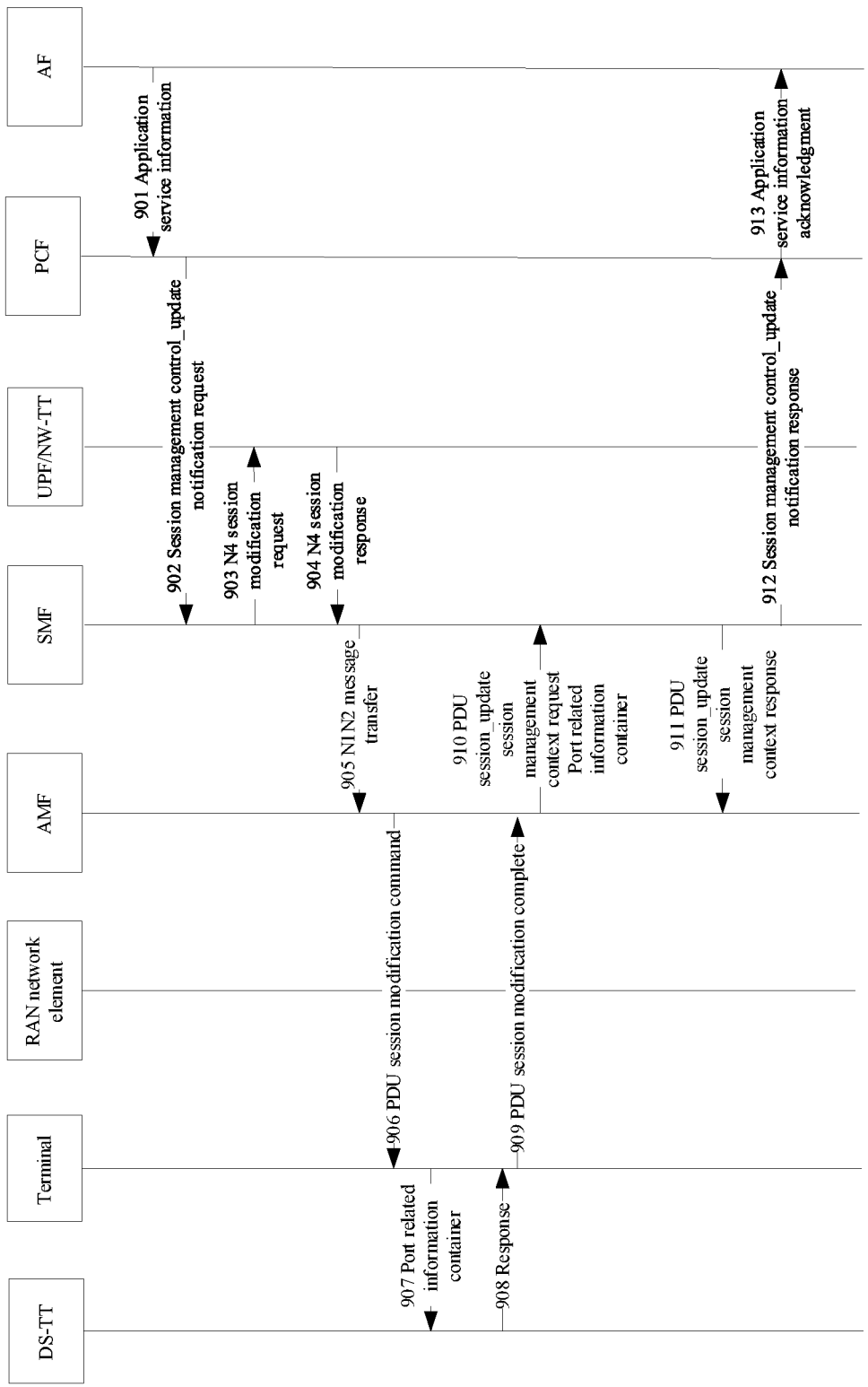
FIG. 9 is a schematic flowchart of a method for supporting port association in an application scenario 3 according to an embodiment of this disclosure.

The application scenario 3 in this embodiment of this disclosure mainly describes a PDU (protocol data unit) session modification procedure triggered by a network. In this procedure, a DS-TT may transmit and receive a first container, and an NW-TT may transmit and receive a second container. Referring to FIG. 9, the procedure includes the following steps.

Step 901: An AF transmits application service information to a PCF. Optionally, the application service information includes the first container and/or the second container. The first container may include a read request for port related information of a port on a DS-TT. The second container may include a read request for port related information of a port on an NW-TT.

In an implementation, after receiving a read request for bridge related control information and/or a read request for port related information, the AF performs step 901.

Step 902: The PCF transmits a session management control_update notification request to an SMF. Optionally, the session management control_update notification request includes the first container and/or the second container in step 901.

The SMF determines that the first container is a container related to a DS-TT port. The SMF transmits the first container in step 905.

The SMF determines that the second container is a container related to an NW-TT port. The SMF transmits the second container to a UPF through step 903.

Step 903: The SMF transmits an N4 session modification request to a UPF. The N4 session modification request includes the second container. When the UPF and the NW-TT are combined, the UPF may transmit port related information of a port on the NW-TT according to the read request for port related information in the second container (as described in the embodiment of FIG. 2, and details are not described herein again). In this case, the port related information of the port on the NW-TT is also included through the second container.

Step 904: The UPF transmits an N4 session modification response to the SMF. The N4 session modification response includes the second container in step 903.

Step 905: The SMF transmits an N1N2 message transfer to the AMF. The N1N2 message transfer includes a PDU session modification command. Optionally, the PDU session modification command includes the first container in step 903.

Step 906: The AMF transmits a NAS message to the UE. The NAS message includes the PDU session modification command.

Step 907: The UE transmits a port related information container to the DS-TT. The DS-TT may transmit port related information of a port on the DS-TT according to the received read request for port related information in the first container. In this case, the port related information to be transmitted is also transmitted through the first container.

Step 908: The DS-TT transmits a response to the UE. The response includes the first container. The first container includes the port related information of the port on the DS-TT.

Step 909: The UE transmits a PDU session modification complete to the SMF. The PDU session modification complete includes the first container in step 908.

The UE may transmit the PDU session modification complete to the AMF through a NAS message.

Step 910: The AMF transmits a PDU session_update session management context request to the SMF. The PDU session_update session management context request includes the PDU session modification complete.

Step 911: The SMF transmits a PDU session_update session management context response to the AMF.

Step 912: The SMF transmits a session management control_update notification response triggered by the SMF to the PCF. The session management policy association modification request triggered by the SMF includes the first container in step 904 and/or the second container in step 910.

Step 913: The PCF transmits an application service information acknowledgment to the AF. The application service information acknowledgment includes the second container in step 904 and/or the first container in step 910. After receiving the port related information in the first container and/or the second container, the AF transmits the port related information to a time-sensitive networking control node (such as a CNC).

Figure 10:
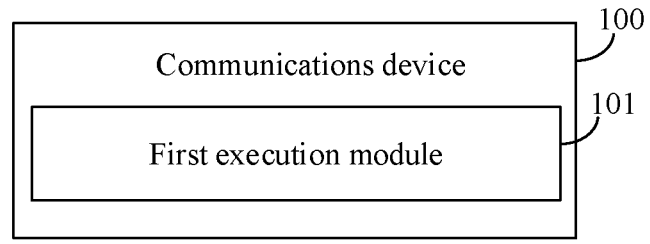
FIG. 10 is a structural diagram of a communications device according to this disclosure.

Referring to FIG. 10, an embodiment of this disclosure provides a communications device. The communications device is a first communications device. As shown in FIG. 10, the communications device 100 includes:

a first execution module 101, configured to perform a first operation.

The first operation includes at least one of the following:
determining a port corresponding to a port related information container;
determining a tunnel corresponding to a port related information container;
transmitting signaling related to the tunnel, where the signaling related to the tunnel includes a port related information container; or
transmitting a port related information container to the tunnel.

In some implementations, the performing a first operation may include: receiving information transmitted by a second communications device; and performing the first operation according to the information transmitted by the second communications device. Optionally, the second communications device includes but is not limited to a first adapter (DS-TT).

In some implementations, the performing a first operation may include: receiving the port related information container and information related to the tunnel; and performing the first operation according to the information related to the tunnel, where the port related information container includes information related to a first port.

In some implementations, the information related to the tunnel may include at least one of the following:
identification information of a port or identification information of the tunnel (such as an identification of a PDU session).

Optionally, the identification information of the port may be port identification information of the first port.

The identification information of the tunnel may be identification information of a tunnel corresponding to the first port.

In at least one embodiment of this disclosure, the communications device 100 may further include:

a transmitting module, configured to transmit identification information of the tunnel, where the tunnel is a tunnel corresponding to the first port.

In this embodiment, the communications device 100 is capable of implementing the processes implemented in the method embodiment shown in FIG. 2 of this disclosure, with the same beneficial effects achieved. To avoid repetition, details are not described herein again.

Figure 11:
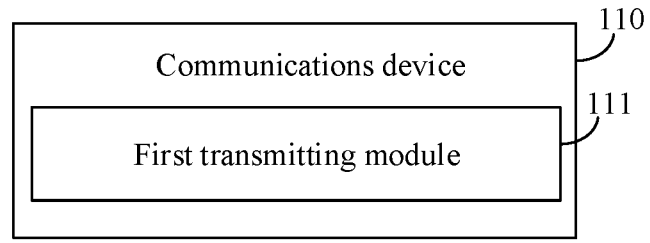
FIG. 11 is a structural diagram of another communications device according to this disclosure.

Referring to FIG. 11, an embodiment of this disclosure provides a communications device. The communications device is a second communications device. As shown in FIG. 11, the communications device 110 includes:

a first transmitting module 111, configured to transmit a port related information container and association information of a tunnel, where the port related information container includes information related to a first port.

In some implementations, the port related information container is a first container of port related information (a first container), where the first container is used to include and/or transmit port related information of a port of a first node (such as a DS-TT); and the first port is a port of the first node. The first container may be different from a second container of port related information (a second container). The second container is used to transmit port related information of a port of a second node (such as an NW-TT).

In some implementations, the information related to the tunnel may include at least one of the following:

identification information of a port or identification information of the tunnel (such as an identification of a PDU session).

Optionally, the identification information of the port may be port identification information of the first port.

The identification information of the tunnel may be identification information of a tunnel corresponding to the first port.

In at least one embodiment of this disclosure, the communications device 110 may further include:

a receiving module, configured to receive identification information of the tunnel, where the tunnel is a tunnel corresponding to the first port.

In this embodiment, the communications device 110 is capable of implementing the processes implemented in the method embodiment shown in FIG. 3 of this disclosure, with the same beneficial effects achieved. To avoid repetition, details are not described herein again.

Figure 12:
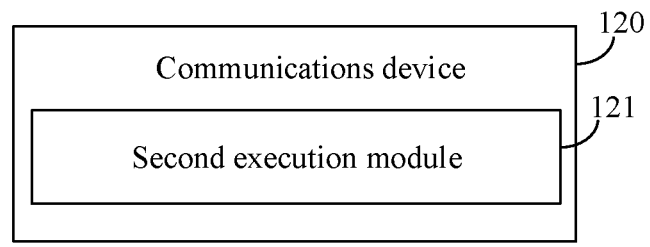
FIG. 12 is a structural diagram of another communications device according to this disclosure.

Referring to FIG. 12, an embodiment of this disclosure provides a communications device. The communications device is a first communications device or a second communications device. As shown in FIG. 12, the communications device 120 includes:

a second execution module 121, configured to cause a first communications device to perform a second operation.

The second operation includes at least one of the following:

determining a port corresponding to a port related information container;

determining a tunnel corresponding to a port related information container;

determining tunnel n corresponding to tunnel m (the tunnel m for example is tunnel m that receives the port related information container (received through related signaling or in a tunnel)); or determining tunnel m corresponding to tunnel n (the tunnel n for example is tunnel n that receives the port related information container (received through related signaling or in a tunnel)), where the port related information container includes information related to a first port, and the first port is a port of a second communications device.

In at least one embodiment of this disclosure, optionally, the second execution module 121 may further perform at least one of the following:

requesting to establish the tunnel m corresponding to a first port, for example, the tunnel may be requested and established by the first communications device or the second communications device;

establishing the tunnel m corresponding to a first port, for example, the tunnel may be established by the first communications device or the second communications device;

saving an association relationship between a first port and a tunnel m;

receiving a port related information container for the first port in a tunnel m or signaling related to a tunnel m; or transmitting a port related information container for the first port in a tunnel m or signaling related to a tunnel m, where the tunnel m is a tunnel between the first communications device and the second communications device.

It can be understood that there may be one or more tunnels between the first communications device and the second communications device. One port is related only to one tunnel m.

Optionally, the second execution module 121 may further perform the following operation: determining at least one of the following based on at least one of the tunnel m related to the port related information container, an association relationship between the tunnel m and the first port, or an association relationship between the tunnel n (such as a PDU session) and the first port:

determining that a port corresponding to the port related information container is the first port;

determining the tunnel n corresponding to the port related information container; or determining the tunnel n corresponding to the tunnel m.

Alternatively, the second execution module 121 may further perform the following operation: determining at least one of the following based on at least one of the tunnel n related to the port related information container, the association relationship between the tunnel m and the first port, or an association relationship between the tunnel n and the first port:

determining that a port corresponding to the port related information container is the first port;

determining the tunnel m corresponding to the port related information container; or determining the tunnel m corresponding to the tunnel n, where the foregoing tunnel n is a tunnel between the first communications device and a wireless communications network, and the tunnel n for example is a PDU session.

In this embodiment, the communications device 120 is capable of implementing the processes implemented in the method embodiment shown in FIG. 4 of this disclosure, with the same beneficial effects achieved. To avoid repetition, details are not described herein again.

Figure 13:
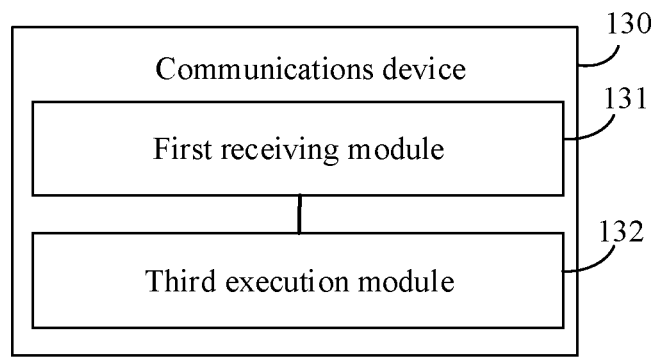
FIG. 13 is a structural diagram of another communications device according to this disclosure.

Referring to FIG. 13, an embodiment of this disclosure provides a communications device. The communications device is a third communications device. As shown in FIG. 13, the communications device 130 includes:
- a first receiving module 131, configured to receive at least one of a first container or a second container; and
- a third execution module 132, configured to perform a third operation according to the received at least one of the first container or the second container.

The third operation includes at least one of the following:
- determining a node related to the first container as a first node;
- determining a node related to the second container as a second node;
- transmitting the first container to a first node; or
- transmitting the second container to a second node.

The first container is an abbreviation of a first container of port related information, configured to transmit port related information of a port of the first node, and the second container is an abbreviation of a second container of port related information, configured to transmit port related information of a port of the second node.

In an implementation, the first container and the second container are different containers. It is not difficult to understand that it can be known according to the first container that the first container is related to the first node, and it can be known according to the second container that the first container is related to the second node.

In some implementations, the first node may include a first adapter (such as a DS-TT).

In some implementations, the second node may include a second adapter (such as an NW-TT).

It is not difficult to understand that through this embodiment, with the first container and the second container that are different, operations on port related information of ports on the first node and the second node can be completed through a single tunnel signaling process, thereby shortening delay of port configuration and reducing signaling overheads.

Figure 14:
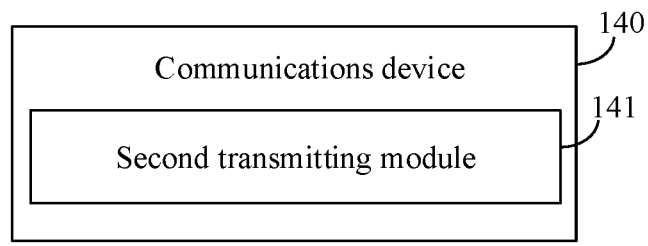
FIG. 14 is a structural diagram of another communications device according to this disclosure.

Referring to FIG. 14, an embodiment of this disclosure provides a communications device. The communications device is a fourth communications device. As shown in FIG. 14, the communications device 140 includes:
- a second transmitting module 141, configured to transmit tunnel establishment request information.

The tunnel establishment request information is used to request establishment of a port related tunnel (such as a PDU session), and the corresponding tunnel establishment request optionally is a PDU session establishment request. Tunnel establishment request information may be included in tunnel establishment request signaling (a PDU session establishment request).

The tunnel establishment request information may include VLAN related information.

In an implementation, the tunnel establishment request information is establishment request information for a port related tunnel. To be specific, the tunnel requested to be established is for the port to connect to a wireless communications network and become a port of a bridge formed by the wireless communications system.

Optionally, the VLAN related information may include at least one of the following:
- a DNN corresponding to a VLAN (that is, different VLANs correspond to different DNNs); or
- VLAN identification information (such as a VID (or may be referred to as VLAN Tag)).

In this embodiment, the communications device 140 is capable of implementing the processes implemented in the method embodiment shown in FIG. 6 of this disclosure, with the same beneficial effects achieved. To avoid repetition, details are not described herein again.

Figure 15:
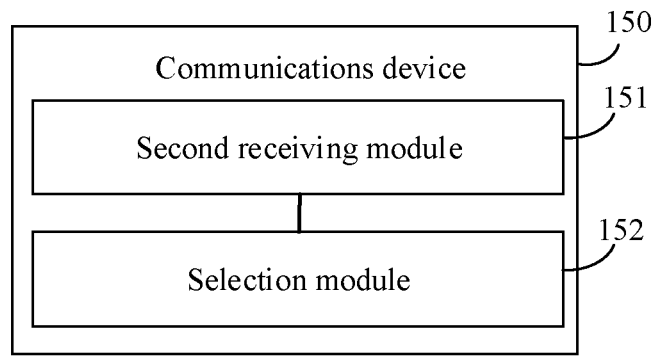
FIG. 15 is a structural diagram of another communications device according to this disclosure.

Referring to FIG. 15, an embodiment of this disclosure provides a communications device. The communications device is a fifth communications device. As shown in FIG. 15, the communications device 150 includes:
- a second receiving module 151, configured to receive tunnel establishment request information; and
- a selection module 152, configured to select a gateway according to the tunnel establishment request information, where
- the tunnel establishment request information includes VLAN related information.

Optionally, the VLAN related information may include at least one of the following:
- a DNN corresponding to a VLAN; or
- VLAN identification information (such as a VID).

In this embodiment, the communications device 150 is capable of implementing the processes implemented in the method embodiment shown in FIG. 7 of this disclosure, with the same beneficial effects achieved. To avoid repetition, details are not described herein again.

Figure 16:
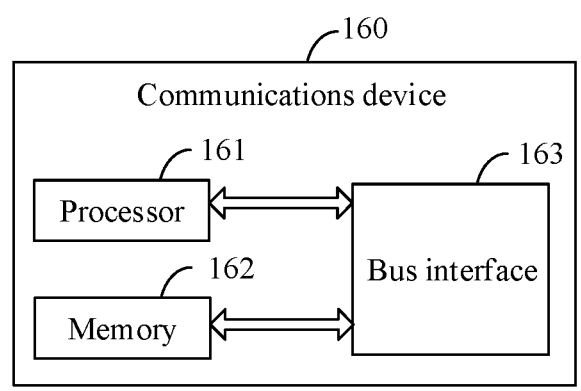
FIG. 16 is a structural diagram of another communications device according to this disclosure.

FIG. 16 is a schematic structural diagram of another communications device according to an embodiment of this disclosure. As shown in FIG. 16, the communications device 160 includes a processor 161, a memory 162, and a computer program stored in the memory 162 and capable of running on the processor. The components of the communications device 160 are coupled together by using a bus interface 163, and when the computer program is executed by the processor 161, the processes implemented in the method embodiment shown in FIG. 2 may be implemented, or the processes implemented in the method embodiment shown in FIG. 3 are implemented, or the processes implemented in the method embodiment shown in FIG. 4 are implemented, or the processes implemented in the method embodiment shown in FIG. 5 are implemented, or the processes implemented in the method embodiment shown in FIG. 6 are implemented, or the processes implemented in the method embodiment shown in FIG. 7 are implemented, with the same technical effects achieved. To avoid repetition, details are not described herein again.

An embodiment of this disclosure further provides a computer-readable storage medium, where a computer program is stored in the computer-readable storage medium, and when the computer program is executed by a processor, the processes implemented in the method embodiment shown in FIG. 2 are implemented, or the processes implemented in the method embodiment shown in FIG. 3 are implemented, or the processes implemented in the method embodiment shown in FIG. 4 are implemented, or the processes implemented in the method embodiment shown in FIG. 5 are implemented, or the processes implemented in the method embodiment shown in FIG. 6 are implemented, or the processes implemented in the method embodiment shown in FIG. 7 are implemented, with the same technical effects achieved. To avoid repetition, details are not described herein again. The computer-readable storage medium is, for example, a read-only memory (ROM), a random access memory (RAM), a magnetic disk, or an optical disc.

It should be noted that in this specification, the terms "include" and "comprise", or any of their variants are intended to cover a non-exclusive inclusion, such that a process, a method, an article, or an apparatus that includes a list of elements not only includes those elements but also includes other elements that are not expressly listed, or further includes elements inherent to such a process, method, article, or apparatus. In absence of more constraints, an element preceded by "includes a . . . " does not preclude the existence of other identical elements in the process, method, article, or apparatus that includes the element.

According to the description of the foregoing implementations, persons skilled in the art can clearly understand that the method in the foregoing embodiments may be implemented by software in addition to a necessary universal hardware platform or by hardware only. In most cases, the former is a preferred implementation. Based on such an understanding, the technical solutions of this disclosure essentially or a part thereof that contributes to related technologies may be embodied in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

The embodiments of this disclosure are described above with reference to the accompanying drawings, but this disclosure is not limited to the foregoing implementations. The foregoing implementations are only illustrative rather than restrictive. Inspired by this disclosure, a person of ordinary skill in the art can still derive many variations without departing from the essence of this disclosure and the protection scope of the claims. All these variations shall fall within the protection of this disclosure.

What is claimed is:

1. A method for supporting port association, applied to a third communications device comprising one of Session Management Function (SMF), Policy Control Function (PCF), Access Management Function (AMF), and Application Function (AF) and comprising:
    receiving at least one of a first container or a second container; and
    performing a third operation according to the received at least one of the first container or the second container, wherein
    the third operation comprises at least one of the following:
    transmitting the first container to a first node; wherein the first container is different from the second container, the first container is used to transmit port related information of a port of the first node, and the second container is used to transmit port related information of a port of the second node; or
    transmitting the second container to a second node; wherein the first container is different from the second container, the first container is used to transmit port related information of a port of the first node, and the second container is used to transmit port related information of a port of the second node.

2. The method according to claim 1, wherein the first node is a device-side time sensitive network translator DS-TT and the second node is a network-side time sensitive network translator NW-TT.

3. The method according to claim 1, wherein the port related information comprises one or more of the following:
    request information for port related information, a port identification, service type information, first routing information, information related to priority regeneration, information related to port transmission rate, information related to bandwidth availability parameter, and information related to transmission selection algorithm, port management capabilities, information related to a bridge delay, traffic class table, gate control information, port neighbor discovery configuration.

4. A communications device, wherein the communications device comprises one of Session Management Function (SMF), Policy Control Function (PCF), Access Management Function (AMF), and Application Function (AF); wherein the communications device comprises a processor, a memory, and a computer program stored in the memory and capable of running on the processor, wherein the computer program, when executed by the processor, causes the communications device to implement:
    receiving at least one of a first container or a second container; and
    performing a third operation according to the received at least one of the first container or the second container, wherein
    the third operation comprises at least one of the following:
    transmitting the first container to a first node; wherein the first container is different from the second container, the first container is used to transmit port related information of a port of the first node, and the second container is used to transmit port related information of a port of the second node; or
    transmitting the second container to a second node; wherein the first container is different from the second container, the first container is used to transmit port related information of a port of the first node, and the second container is used to transmit port related information of a port of the second node.

5. The communications device according to claim 4, wherein the first node is a device-side time sensitive network translator DS-TT and the second node is a network-side time sensitive network translator NW-TT.

6. The communications device according to claim 4, wherein the port related information comprises one or more of the following:
    request information for port related information, a port identification, service type information, first routing information, information related to priority regeneration, information related to port transmission rate, information related to bandwidth availability parameter, and information related to transmission selection algorithm, port management capabilities, information related to a bridge delay, traffic class table, gate control information, port neighbor discovery configuration.

7. A non-transitory computer-readable storage medium, wherein a computer program is stored in the non-transitory computer-readable storage medium, and the computer program, when executed by a processor associated with a communications device comprising one of Session Management Function (SMF), Policy Control Function (PCF), Access Management Function (AMF), and Application Function (AF), causes the non-transitory computer-readable storage medium to implement:
    receiving at least one of a first container or a second container; and
    performing a third operation according to the received at least one of the first container or the second container, wherein
    the third operation comprises at least one of the following:
    transmitting the first container to a first node; wherein the first container is different from the second container, the first container is used to transmit port related information of a port of the first node, and the second container is used to transmit port related information of a port of the second node; or transmitting the second container to a second node; wherein the first container is different from the second container, the first container is used to transmit port related information of a port of the first node, and the second container is used to transmit port related information of a port of the second node.

8. The non-transitory computer-readable storage medium according to claim 7, wherein the first node is a device-side time sensitive network translator DS-TT and the second node is a network-side time sensitive network translator NW-TT.

9. The non-transitory computer-readable storage medium according to claim 7, wherein the port related information comprises one or more of the following:

request information for port related information, a port identification, service type information, first routing information, information related to priority regeneration, information related to port transmission rate, information related to bandwidth availability parameter, and information related to transmission selection algorithm, port management capabilities, information related to a bridge delay, traffic class table, gate control information, port neighbor discovery configuration.

* * * * *